3,473,912
METHOD OF GRANULATING FINES USING AN ALKYL ARYL SULFONATE GRANULATING AGENT
Philip B. Mischel, Greenlawn, N.Y., assignor to Petrochemicals Company, Inc., Fort Worth, Tex.
No Drawing. Filed Feb. 20, 1967, Ser. No. 617,048
Int. Cl. C05b 19/02, 1/06
U.S. Cl. 71—64
3 Claims

ABSTRACT OF THE DISCLOSURE

An improved method of granulating fines of a character that tend to coalesce into granules of larger size when subjected to a tumbling action in the presence of water which comprises moistening the surface of the fines with an alkali metal salt of a sulfonated mixture of alkylated derivatives of naphthalene containing methyl groups and/or alkyl groups of 8–12 carbon atoms.

BACKGROUND OF THE INVENTION

Field of the invention

The manufacture of granulated materials, and in particular, superphosphate fertilizers in granules within a particular size range.

Description of the prior art

Heretofore in the manufacture of superphosphate fertilizer, ground phosphate rock and sulphuric acid have been subjected to a mixing action, and then dumped into a den where it sets up into a solid mass. After the mass had hardened in a den, it was removed therefrom and transferred to a curing pile. From the curing pile, the superphosphate was transferred to a blunger or pug mill which beat a major portion thereof into spheroids within a desired size range. The superphosphate moved from the mill to a rotary dryer. When discharged from the dryer and screened to granules within a desired size range, the material was in a marketable condition. However, the fines resulting from such an operation were not marketable, and had to be formed into granules within a predetermined size range before any substantial commercial demand therefor was received.

Also in the past, the superphosphate from the curing pile has been transferred to a so-called (TVA) granulator, which is a large horizontally disposed cylinder that rotates about its longitudinal axis. Due to the rolling action to which the superphosphate was subjected in the granulator, it was partially reduced to granules within a predetermined size range. In forming the granules in the manner described, a substantial quantity of fines would also be formed for which there is no commercial market. Accordingly, these fines had to be recycled to form them into granules within a predetermined size range.

The particular size range for superphosphate granules under present day conditions that are commercially desirable runs from −5 +16 to −6 +20. This nomenclature simply means that all of the granules in a particular size range must pass through a 5 or 6 mesh screen, and none of the granules pass through a 16 or 20 mesh screen, as the case may be.

In the granulating of superphosphate fertilizer by the prior means above mentioned, it has been common to find that 30% to 40% of the weight of the material passing through the granulator has been converted into fines that have to be recycled. Such recycling of these fines adds to the expense of manufacturing superphosphate and one susceptible to reduction if the efficiency of the operation can be improved.

In discussing superphosphate fertilizers herein, reference is made to a formulation containing less than 22% by weight of $P_2O_5$ that may or may not be in combination with nitrogen and potassium-containing compounds. Fertilizer grades of the order 0–22–0; 0–20–20; 5–15–15; 5–10–10 are considered to be superphosphates, although some additional $P_2O_5$ in the form of phosphoric acid is added to the $P_2O_5$ content thereof.

SUMMARY OF THE INVENTION

An improved method for granulating fines of mineral ammonium salts including superphosphates into granules within a predetermined size range by subjecting the fines to the action of an alkyl aryl sulfonate prior to the granulating operation.

DESCRIPTION OF THE PREFERRED EMBODIMENT

The present invention is on the granulation of −60 fines resulting from the commercial production of 5–10–10 superphosphate in a −8 +16 granule range. The granulating agent used is an alkyl aryl sulfonate manufactured and sold under the trademark Petro P as described in United States Patent No. 2,773,896 entitled "Manufacture of Alkyl Aryl Sulfonates," that issued to James W. Putt on Dec. 11, 1956. In addition to $P_2O_5$ as superphosphate, the 5–10–10 material includes calcium sulphate, ammonia and potassium chloride, as well as the various salts and impurities normal to phosphate rock converted to superphosphate. The 5–10–10 material is an "ammoniated" superphosphate and is typical of such products.

The Petro P agent is an essentially non-hygroscopic, water soluble, alkali metal salt of a sulfonated mixture of alkylated derivatives of naphthalene containing methyl groups and/or alkyl groups with 8 to 12 carbon atoms. Desirable alkyl groups are introduced by reacting the suitable aromatic hydrocarbons with olefins, such as nonylene, diisobutylene and tri-isobutylene. A suitable catalyst, as for example, sulphuric acid may be used for this purpose. The Petro P agent is readily soluble in water, producing free-flowing substantially transparent solutions even at 55–60% concentrations. Such a solution provides the advantage that the agent does not precipitate to any material extent in the presence of calcium ions.

The effectiveness of the above described agent has been determined on a laboratory scale by granulating the −60 superphosphate fines, both with and without the addition thereto of the Petro P agent prior to the granulating operation.

In carrying out the granulation operation on a pilot laboratory scale the following conventional equipment was employed:

(1) Power-driven, horizontal, laboratory size, rotatable drum provided with means to add a water spray to material within the confines thereof.
(2) Drying pans.
(3) Drying oven.
(4) Motorized shaker and screens.

To control the experiment, the 5–10–10 superphosphate −60 fines were granulated in five pairs of runs, with one run in each pair being made with Petro P agent added to the fines, and the other run in each pair, without the use of the Petro P agent.

In the test procedure employed, the 5–10–10 superphosphate fines to be granulated were pre-moistened to the same degree, both with and without Petro P agent, as dictated by the particular run. The moistened charge was then added to the drum, and the latter caused to rotate. A fine spray of water was added to the rotating fines in the drum until granule formation appeared complete. The granulated material from the drum was thereafter discharged to the drying pans, and subsequently from the pans to the oven. At the time of removal of the granulated material from the drum, a moisture sample was selected, and the moisture of the sample determined. After drying, the granules were screened on the shaker, and the —8 +16 fraction selected and weighed as a fraction of the whole sample on a dry basis.

A yield of 80.9% by weight of —8 +16 granules of 5–10–10 superphosphate was obtained as an average of five runs when the —60 fines of the 0.05% Petro P agent by weight had been added thereto prior to the granulation. The granules of 5–10–10 superphosphate at the time of discharge from the drum in the five runs had an average moisture content of 9.7% by weight. When —60 fines of 5–10–10 of superphosphate were granulated as above described, without the addition of Petro P agent thereto, the yield on an average of five runs by weight was 65.2% granules in the —8 +16 size range.

Although 0.05% Petro P agent by weight is sufficient to thoroughly wet out all surfaces of —60 particles of 5–10–10 superphosphate, additional tests were made with other concentrations of Petro P agent to verify the granulating effect, and to determine what changes, if any, would occur as the concentration of the agent was increased.

The following concentrations of Petro P agent were run on —60 fines of 5–10–10 superphosphate:

| | Percent Petro P by weight |
|---|---|
| (1) | 0.01 |
| (2) | 0.05 |
| (3) | 0.1 |
| (4) | 1.0 |
| (5) | 10.0 |

In no concentration of the Petro P agent was any difference detected in the granulation characteristics of the —60 fines of the 5–10–10 superphosphate. When 10% by weight of Petro P agent was used, a yield of 78.5% granules by weight of —8 +16 superphosphate was obtained, which is quite close to the yield of 80.9% obtained when but 0.05% by weight of Petro P agent was used.

In carrying out the above described granulating operation on a pilot scale, the experimental conditions were as follows:

(1) Speed of drum—⅓ critical speed.
(2) Water feed—fines, water spray.
(3) Method of adding Petro P agent—premixed with fines.
(4) Time of graulation—variable for particle size formation.
(5) Drying time—one hour.
(6) Drying temperature—250° F.
(7) Hardness test of granule—conventional (thumb)
(8) Sieve sizes—U.S. standard.

The critical speed above referred to is the speed at which the fines are not tumbled, but due to centrifugal action, are rotated as a mass.

From the above tests it will be seen that the addition of the Petro P agent to fines that tend to granulate when tumbled in the presence of water increases the yield of granules from this operation.

I claim:
1. A method of increasing the yield of granules within a —8 +16 mesh size range from wetting agent free fines of mineral ammonium salts, including ammoniated super phosphates, comprising the steps of:
   (a) moistening the surfaces of said fines with sufficient volume of an aqueous solution of an alkali metal salt of a sulfonated mixture of naphthalenes and their alkylated derivatives containing alkyl groups with 8 to 12 carbon atoms, so that said salt is present within the range of 0.01 to 10% by weight of said fines;
   (b) tumbling said moistened fines in a confined space;
   (c) subjecting said moistened fines as they are tumbled to a fine water spray;
   (d) continuing to spray said fines with water until said fines coalesce into granules within said —8 +16 mesh size range;
   (e) discharging said fines and granulated fines from said confined space;
   (f) drying said fines and granulated fines after discharge thereof from said confined space; and
   (g) screening said fines and granulated fines into separate granules within said —8 +16 mesh size range.

2. A method as defined in claim 1, wherein said fines are subjected to said aqueous solution by mixing said fines with said agent and spraying the resulting mixture with water.

3. A method as defined in claim 1, wherein said fines are subjected to said aqueous solution by mixing said fines with said agent and adding water to the resulting mixture.

References Cited

UNITED STATES PATENTS

| 2,221,175 | 11/1940 | Bechtold | 23—313 |
| 2,639,225 | 5/1953 | Venuto | 23—313 |
| 2,802,728 | 8/1957 | Jacquier | 71—64 |
| 3,034,858 | 5/1962 | Vives | 71—64 |

OTHER REFERENCES

Sauchelli, Vincent, Chemistry and Technology of Fertilizers, pp. 271, 274, 276–277 and 279. Reinhold Publish. Corp., New York (1960).

S. LEON BASHORE, Primary Examiner

T. G. FERRIS, Assistant Examiner

U.S. Cl. X.R.
71—34, 61